United States Patent
Enders et al.

(10) Patent No.: US 6,807,989 B2
(45) Date of Patent: *Oct. 26, 2004

(54) FLEXIBLE CORD-LIKE HOLLOW OBJECT

(75) Inventors: Silvia Enders, Baden-Baden (DE); Holger Ullrich, Rastatt (DE); Thomas Fritz, Gernsbach (DE)

(73) Assignee: Aeroquip-Vickers International GmbH, Baden Baden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/385,112

(22) Filed: Mar. 10, 2003

(65) Prior Publication Data

US 2003/0172982 A1 Sep. 18, 2003

Related U.S. Application Data

(62) Division of application No. 09/529,330, filed as application No. PCT/EP99/05849 on Aug. 12, 1999, now Pat. No. 6,532,994.

(30) Foreign Application Priority Data

Aug. 12, 1998 (DE) .......................................... 198 37 497

(51) Int. Cl.$^7$ ................................................ F16L 11/04
(52) U.S. Cl. ..................... 138/138; 138/143; 428/36.91
(58) Field of Search ................................ 138/138, 127, 138/125, 143; 428/36.91; 427/69, 70

(56) References Cited

U.S. PATENT DOCUMENTS

| | | |
|---|---|---|
| 801,494 A | 10/1905 | Wilhelmi |
| 3,044,256 A | 7/1962 | Bayly et al. |
| 3,706,326 A | 12/1972 | Bringolf |
| 3,799,825 A | 3/1974 | Champleboux et al. |
| 4,091,843 A | 5/1978 | Mikes et al. |
| 4,257,459 A | 3/1981 | Jenks |
| 4,351,364 A | 9/1982 | Cocks |
| 4,383,554 A | 5/1983 | Merriman |
| 4,385,645 A | 5/1983 | Campbell et al. |
| 4,559,095 A | 12/1985 | Babbin |
| 4,842,024 A | 6/1989 | Palinchak |
| 4,870,995 A | 10/1989 | Igarashi et al. |
| 4,903,735 A | 2/1990 | Delacour et al. |
| 4,905,735 A | 3/1990 | Akiyoshi |
| 4,998,564 A | 3/1991 | Igarashi et al. |
| 5,016,675 A | 5/1991 | Igarashi et al. |
| 5,093,166 A | 3/1992 | Nishimura |
| 5,145,628 A | 9/1992 | Karg et al. |
| 5,264,262 A | 11/1993 | Igarashi |
| 5,316,046 A | 5/1994 | Igarashi et al. |

(List continued on next page.)

FOREIGN PATENT DOCUMENTS

| | | |
|---|---|---|
| DE | 4020798 | 1/1991 |
| DE | 19608318 | 8/1997 |
| EP | 0 375 608 A1 | 12/1989 |
| EP | 35608 | 6/1990 |
| EP | 0384995 A | 9/1990 |

OTHER PUBLICATIONS

Schiefer, Kurth, Lexikon der Verfahrenstechnik, 1970, pp. 236–239.

*Primary Examiner*—James Hook
(74) *Attorney, Agent, or Firm*—Emch, Schaffer, Schaub & Porcello Co., L.P.A.

(57) ABSTRACT

A flexible cord-like hollow object for the transportation of media is provided with an inner zone enclosed by a casing having an inner layer, a middle layer and an outer layer. A barrier layer, which is impermeable to volatile molecules of the medium to be transported, is integrated into the casing on the outer surface of the inner layer between the inner layer and the middle layer. The barrier layer comprises sub-elements that are arranged in a scale-like manner.

9 Claims, 2 Drawing Sheets

U.S. PATENT DOCUMENTS

| | | |
|---|---|---|
| 5,348,779 A | 9/1994 | Igarashi |
| 5,380,385 A | 1/1995 | Derroire et al. |
| 5,462,091 A | 10/1995 | Saupe |
| 5,507,993 A | 4/1996 | Fortuin et al. |
| 5,585,154 A | 12/1996 | Rhoades |
| 5,621,070 A | 4/1997 | Howard, Jr. |
| 5,656,091 A * | 8/1997 | Lee et al. .............. 118/726 |
| 5,686,157 A | 11/1997 | Harvey et al. |
| 5,718,956 A | 2/1998 | Gladfelter et al. |
| 5,957,174 A | 9/1999 | Campbell |
| 5,974,973 A | 11/1999 | Tittgemeyer |
| 5,985,385 A | 11/1999 | Gottfried |
| 6,029,712 A | 2/2000 | Dougherty |
| 6,328,075 B1 | 12/2001 | Furuta et al. |
| 6,390,140 B2 | 5/2002 | Niki et al. |
| 2001/0023714 A1 | 9/2001 | Niki et al. |

* cited by examiner

FLEXIBLE CORD-LIKE HOLLOW OBJECT

International Appl. No. PCT/EP99/05849 filed Aug. 12, 1999 and German Patent Appl. No. 19837497.6 filed Aug. 12, 1998

This application is a divisional of U.S. application No. 09/529,330 filed Jun. 19, 2000, now U.S. Pat. No. 6,532,994 which a 371 of PCT/EP99/05849 filed Aug. 12, 1999.

The invention pertains to a flexible cord-like hollow object with an inner zone, which is enclosed by a casing, for the transportation of media.

Flexible cord-like hollow objects of this generic type are known. These cord-like hollow objects, which are also called tube[s] below, are used in many sectors of industry for the transportation of liquid or gaseous media. Such tubes are used for the transportation of refrigerants for use in technical climate control units, e.g. in motor vehicles. Refrigerants have the property that they are volatile and lead to harmful effects when they get into the earth's atmosphere. In order to avoid this, use should be made of natural refrigerants, e.g. $CO_2$. In the case of known refrigerant tubes, it is a disadvantage that these are not diffusion-proof and that they exhibit high permeability to natural refrigerants, especially carbon dioxide $CO_2$.

A flexible pipe for the transportation of media is known from EP 0 375 608 A1 in which a barrier layer is integrated into the casing of a flexible cord-like hollow object in order to reduce permeation.

The barrier layer is formed from a longitudinal or spiral-shaped metal foil that is overlapped at the edges of the strip. In the case of this arrangement, it is a disadvantage that freedom from leakage of the barrier layer cannot be ensured adequately especially in the event of a high bending stress.

Thus the objective of the invention is to create a flexible cord-like hollow object of this generic type that has low permeability in combination with high flexibility, especially in the case of $CO_2$.

In accordance with the invention, this objective is accomplished by means of a flexible cord-like hollow object with the characterizing features that are designated in Claim 1. As a result of the feature that a barrier layer, which is impermeable to the volatile molecules of the medium that is to be transported, is integrated into the casing of the hollow object and that the barrier layer comprises sub-elements that are arranged in a scale-like manner, permeation through the flexible cord-like hollow object is prevented with high efficiency or it is at least reduced to a negligibly low value. Thus it becomes possible to transport refrigerants without the volatile components of the refrigerant being able to get into the atmosphere, especially when, as is preferred, the flexible cord-like hollow objects are used as a refrigerant tube. A low rate of permeation simultaneously ensures reliable functioning of the refrigeration unit that is to be supplied with the refrigerant. In particular, the scale-like arrangement of the sub-elements permits stressing due to bending of the flexible hollow object as previously. Because of the overlapping of the sub-elements, this freedom from leakage of the barrier layer is not impaired during stressing due to bending. The scale-like arrangement of the sub-elements leads to the situation in which the barrier layer does not break during stressing due to bending. Breakage or damage to the barrier layer would lead to an increase in the rate of permeation.

The scale-like construction can be achieved in a very advantageous manner by producing an appropriate crystal structure during the vapor deposition of the metallic barrier layer that is preferably provided.

The scale-like construction for the crystal structure can preferably be obtained via the vapor deposition of a crystalline substance on a layer of the casing that serves as a carrier layer, whereby the crystalline substance comprises e.g. metal or a synthetic material. As a result, crystalline regions (platelets) are produced, which are absolutely impermeable, on the surface of the layer of the casing that serves as the carrier. As a result, the situation is reached in the non-expanded state, i.e. the non-stressed state, that the flexible cord-like hollow object (tube) is almost completely impermeable to the refrigerant that is to be transported. Negligibly low permeation can arise only through extremely small seams between the vapor deposited platelets. If the platelets are vapor deposited in such a way that they overlap, then a degree of overlapping of the platelets can be ensured even during stressing due to bending or tensile stressing of the tube so that, for example, 99% of the total surface is covered with the crystalline platelets even in such a state of the tube.

An advantageous feature, in particular, as a result of this is that use can be made of the flexible cord-like hollow object, which has been provided with the crystalline platelets, even in the high pressure range and the low permeability remains intact. Such high pressure expansion tubes, which have been provided with such a barrier layer in accordance with the invention, excel by virtue of their high flexibility, shrinkage attenuation and favorable effect on acoustics so that these advantages can be exploited along with the simultaneous assurance of low permeability.

In particular, use can be made of carbon dioxide $CO_2$ as the refrigerant in high pressure expansion tubes that have the barrier layer in accordance with the invention. The use of carbon dioxide as the refrigerant in the high pressure range leads, as such, to the problem of so-called decompressive explosion in the event of a sudden drop in pressure. The formation of large aggregates of the refrigerant occurs abruptly in a material that is in contact with the refrigerant. This would lead to damage or, as the case may be, the destruction of the material. As a result of the barrier layer in accordance with the invention, the situation is now reached in which damage to the material, i.e. the casing of the flexible cord-like hollow object here, cannot occur since permeation of the molecules of carbon dioxide, which is used as the refrigerant, into the casing is prevented.

Permeation is prevented or, as the case may be, reduced to a negligible minimum even in the case of high pressure expansion because of the aforementioned scale-like arrangement of the crystalline platelets in particular.

Moreover, it is preferable if the barrier layer comprises sub-elements that have been arranged in a scale-like manner, whereby the sub-elements overlap in the longitudinal extension of the hollow object and/or coaxially relative to a longitudinal axis of the hollow object. As a result, a leakage-proof arrangement of the barrier layer is achieved that, moreover, impairs the flexibility of the hollow object only to an insignificant extent.

In a preferred form of embodiment of the invention, the feature is provided that the barrier layer is arranged on the outer casing surface of an inner layer of the casing. As a result, it becomes possible and preferable to integrate the barrier layer into the casing without this [casing] impeding the cross section of the inner zone of the hollow object. The inner casing surface of the inner layer of the casing can thus be optimized in terms of the medium that is to be transported so that flow resistance, which is as low as possible, is provided. However, the barrier layer, which is applied to the outer casing surface of the inner layer, prevents the diffusion of the volatile components of the medium, which is to be transported, through the casing. In the event that these diffuse through the inner layer of the casing, they then encounter the barrier layer and they cannot pass through the casing. Thus the low permeability of the casing is ensured.

In a further preferred form of embodiment of the invention, the feature is provided that the barrier layer comprises metal or a synthetic material. As a result, a material can be selected in a simple manner that is optimal for the medium that is to be transported, whereby the material exhibits especially good barrier action with respect to the volatile components of the medium that is to be transported.

Moreover, the feature is provided in a further preferred form of embodiment of the invention that the barrier layer is connected to the outer casing surface of the inner layer of the casing in a non-positive [adherent] manner. As a result, the situation is reached in which detachment of the barrier layer can be prevented during subsequent usage of the flexible cord-like hollow object in accordance with directions so that the low permeability, which has been achieved, remains intact. The feature is preferably provided that the casing surface is treated physically and/or chemically in order to increase the strength of adhesion between the barrier layer and the casing surface. As a result, roughening can be achieved, preferably and in particular, and this ensures better adherent bonding to the subsequently applied barrier layer.

In particular, it is preferred that an increase in the strength of adhesion between the barrier layer and the casing surface be obtained via the polarization or activation of the material of the casing at least in the surface region of the casing surface of the inner layer of the casing. Depending on the material of the casing, which preferably comprises a polymer, polar groups can be incorporated, as a result, into the basic molecular structure of the casing, whereby these polar groups ensure an improvement in the coating of the casing surface with the barrier layer.

In a preferred form of embodiment of the invention, moreover, the situation is provided in which an additional bonding agent is arranged between the barrier layer and the casing surface. This additional bonding agent leads to an especially strong and durable non-positive [adherent] joint between the barrier layer and the casing so that the adherent bonding between the barrier layer and the casing remains intact even with relatively intense mechanical stressing during usage, which is in accordance with directions, and its low permeability can be maintained.

Further preferred forms of embodiment of the invention result from the remaining characterizing features that are designated in the subsidiary claims.

The invention will be elucidated in more detail below in examples of embodiments on the basis of the associated drawings. The following aspects are shown.

Figure 1:
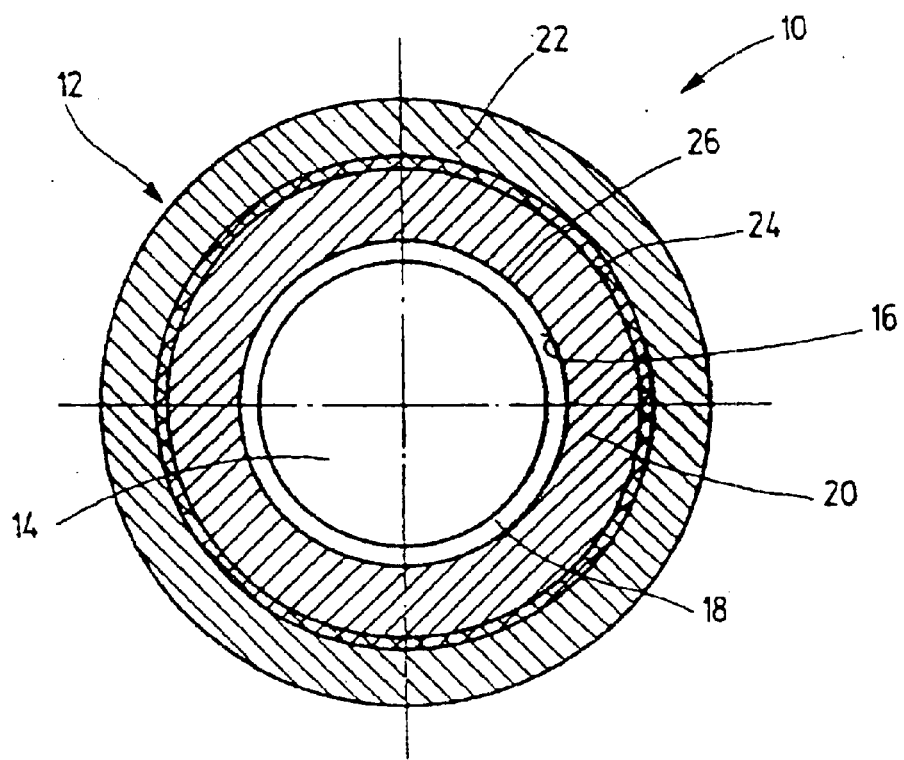
FIG. 1 shows a cross section through a refrigerant tube.

FIG. 1 shows a refrigerant tube 10 in the form of a cross section. The refrigerant tube 10 comprises a casing, which is designated in its entirety by 12, that encloses an inner zone 14. The casing 12 is formed from a flexible cord-like hollow object that encloses an inner zone 14 that is preferably constructed in the form of a cylinder with a circular cross section. In accordance with further examples of embodiments, the inner zone 14 can also have a different shape, e.g. an oval or similar shape. The casing 12 is constructed in a multi-layer manner. A middle layer 20 is arranged around an inner layer 18, whereby an outer layer 22 adjoins the middle layer. A reinforcing layer 24 is arranged between the middle layer 20 and the outer layer 22. The layers 18, 20 and 22 of the casing 12 comprise a polymeric material, for example. The reinforcing layer 24 comprises a flexible fabric-reinforced layer, for example.

A barrier layer 26 is applied to an outer casing surface 16 of the inner layer 18. The barrier layer 26 is connected over its entire surface and in a non-positive [adherent] manner to the casing surface 16. The barrier layer 26 can be achieved in such a way, for example, that the inner layer 18 is produced first, and then the barrier layer 26 is applied thereto, and subsequent layer assembly takes place on the barrier layer 26.

The barrier layer 26 comprises a metal or a synthetic material, for example. The material of the barrier layer 26 is optimized in terms of the refrigerant that is to be transported through the inner zone 14 of the refrigerant tube 10. Consideration can be given to e.g. to carbon dioxide $CO_2$ as the refrigerant.

The casing surface 16 can be roughened in order to achieve a high strength of adhesion between the barrier layer 26 and the inner layer 18. This can take place e.g. physically, via the mechanical action of a suitable device, or chemically via alkalis, acids or similar substances. Adherent bonding to the barrier layer 26 is improved as a result of the roughness that is thereby achieved. In accordance with a further example of an embodiment, a bonding agent can be applied between the barrier layer 26 and the layer 18 and/or the layer 20. The casing surface 16 can also be polarized or activated in order to increase the strength of adhesion.

Figure 2:
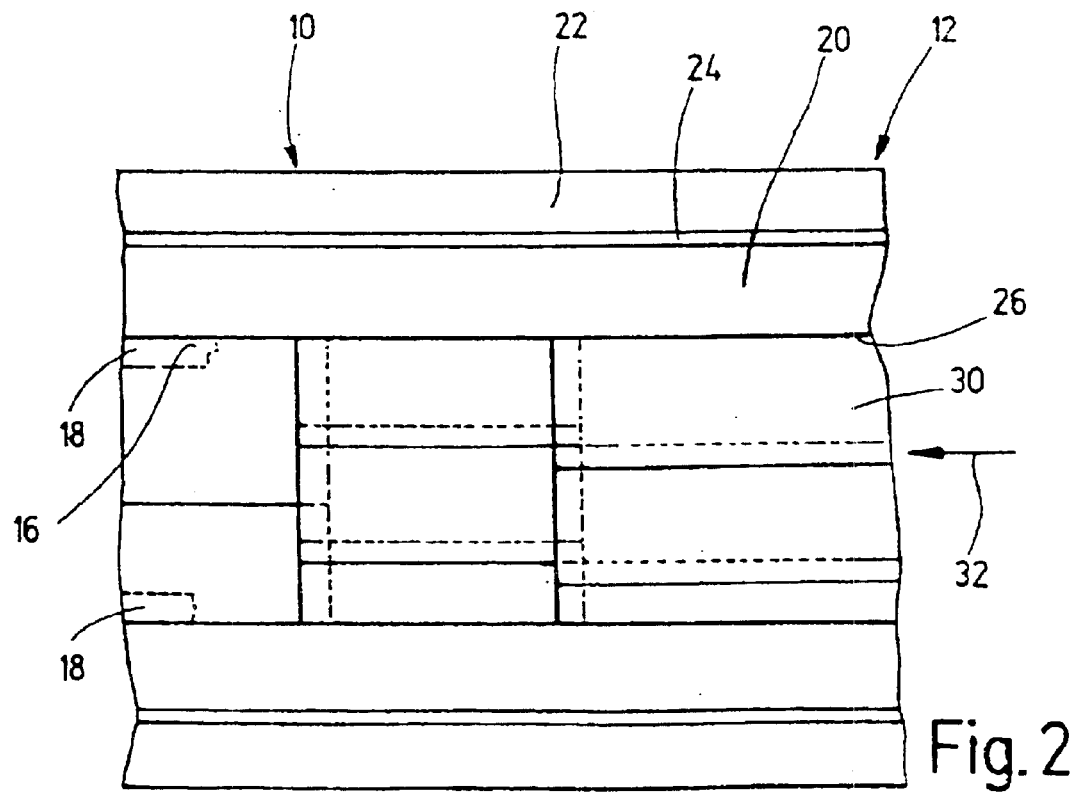
FIG. 2 shows a longitudinal section though a segment of a refrigerant tube.
Figure 3:
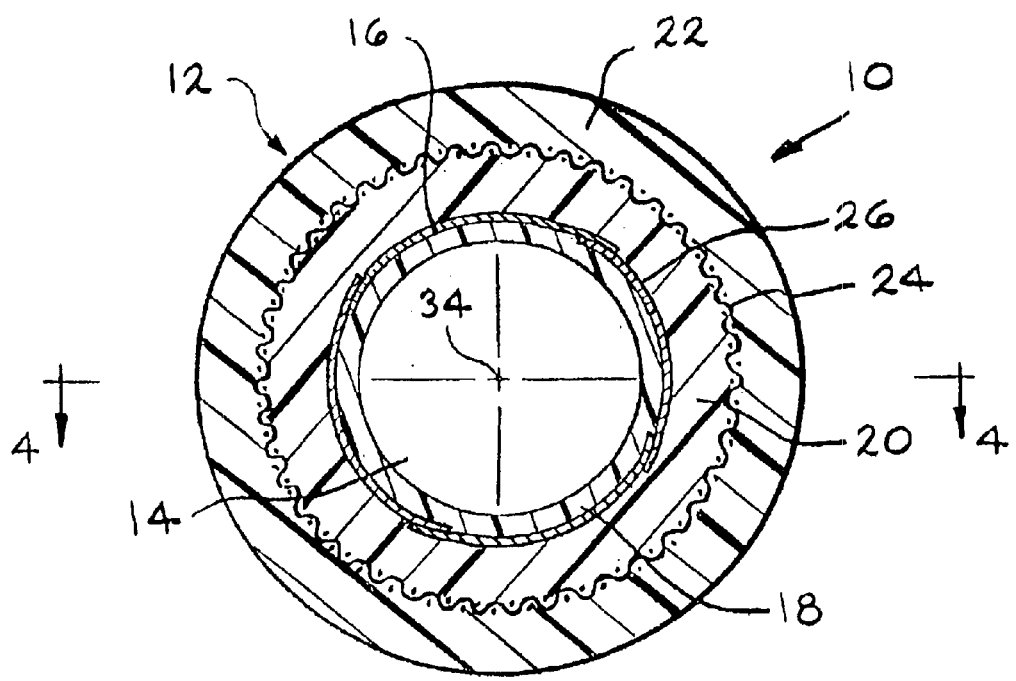
FIG. 3 is a view similar to FIG. 1 with additional detail and cross-hatching of section lines.
Figure 4:
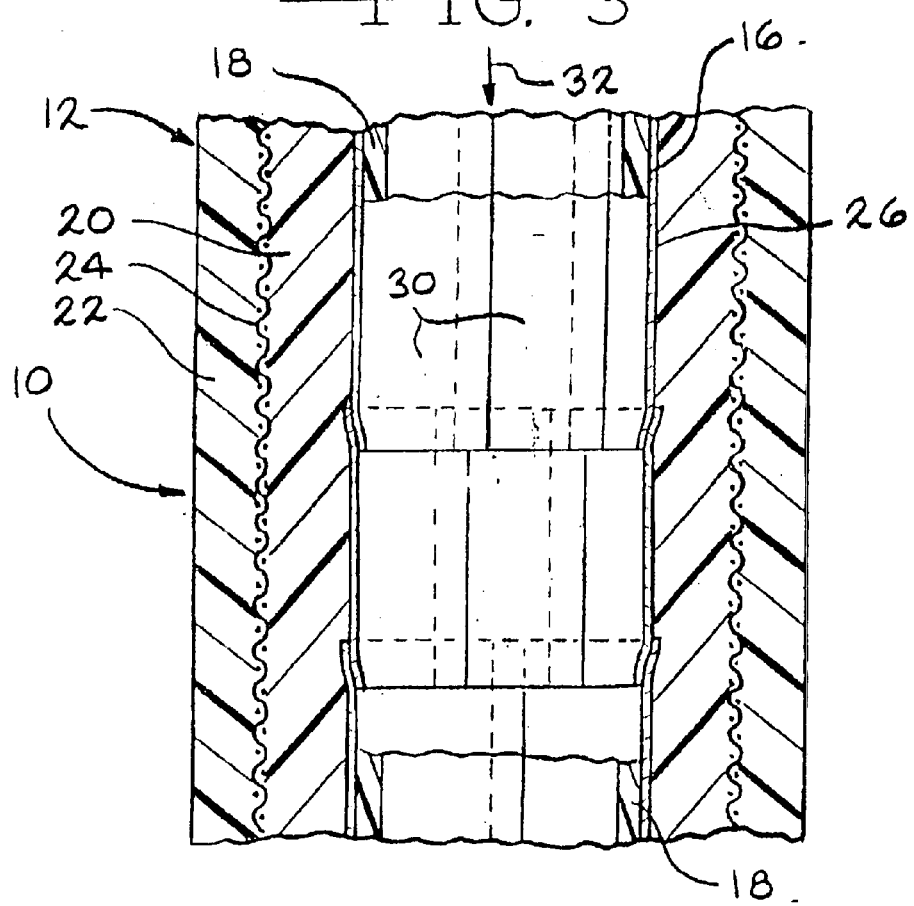
FIG. 4 is a sectional view taken through line 4—4 of FIG. 3.

FIG. 2 shows a schematic longitudinal section through the refrigerant tube 10. Parts that are identical to those in FIG. 1 are provided with identical reference numbers and are not elucidated a second time. For reasons of obtaining a good overview, the inner layer 18 is not illustrated in FIG. 2 so that the barrier layer 16 is seen, as it were, in the cut open hollow zone 14. This [barrier layer] is, as such, concealed by the inner layer (indicated on the left in FIG. 2). A further variant of an embodiment will be illustrated by means of the longitudinal section, whereby the barrier layer 26 comprises individual sub-elements 30 that lie adjacent to the casing surface in a scale-like manner. The casing surface 16 can, in turn, be mechanically and/or chemically roughened as in the case of the example of an embodiment that has already been discussed in connection with FIG. 1. Moreover, an additional bonding agent can be provided that is arranged between the inner layer and the barrier layer 26 and/or the middle layer 20 and the barrier layer 26. FIG. 2 indicates, by means of the arrow 32, the hypothetical direction of transportation of a refrigerant through the inner zone 14. The scale-like arrangement, which is preferably provided, for the sub-elements 30 of the barrier layer 26 can take place in such a way that these overlap both in the transportation direction 32 and also coaxially relative to the central axis 34 (in accordance with a further variant of an embodiment, overlapping can be dispensed with) (FIG. 1). As a result of the scale-like arrangement of the barrier layer 26, the flexibility of the refrigerant tube 10 is modified only insignificantly by the introduction of the barrier layer 26. The sub-elements 30, which are arranged in a scale-like manner, can follow [accommodate], with no problem, stress due to the bending of the casing 12. The bending of the casing 12 can be followed [accommodated] in all spatial directions by the barrier layer 26 because of the overlapping of the sub-elements 30 in the transportation direction 32 and/or in the coaxial direction relative to the longitudinal axis 34.

It will be clear, in an overall way, that a refrigerant can be transported as a result of the integration of the barrier layer 26 into the casing 12, whereby the volatile components of the refrigerant are unable to diffuse through the casing 12. Because of the barrier layer 26, this [casing] acquires an extremely low permeability for the molecules of the refrigerant that it is to be transported. On the other hand, the diffusion of molecules in the opposite direction and into the inner zone 14 is also prevented by the barrier layer 26.

What is claimed is:

1. A flexible cord-like hollow object comprising a casing (12) extending along an axis and encircling an inner zone for the transportation of a medium having volatile molecules, whereby a barrier layer (26), which is impermeable to said volatile molecules of the medium that is to be transported, is integrated into the casing (12), characterized by the feature that the barrier layer (26) has a crystal structure, is integrated into the casing (12) by vapor deposition of said crystal structure and comprises sub-elements (30) that are arranged in a scale-like manner to overlap in the transportation direction of the medium and coaxially relative to said axis.

2. A method for preventing excessive permeation of fluid flowing through an inner zone (14) or passageway of a flexible hollow object (10), said inner zone extending along an axis, said hollow object having an inner layer and an outer layer comprising the steps of
    (a) applying by vapor deposition a barrier layer (26) of metal or synthetic material between said inner layer (18) and said outer layer, said barrier layer (26) having sub-elements (30);
    (b) causing said sub-elements (30) to be positioned in overlapping relationship relative to adjacent sub-elements both in the direction of transportation of said fluid and co-axially relative to the longitudinal axis; and
    (c) directing the flow of said fluid through said inner zone (14) in the direction of overlapping.

3. A flexible cord-like hollow object comprising a casing extending along a longitudinal axis and having an inner layer encircling an inner zone for the transportation of a medium having volatile molecules, said inner layer having an outer surface, an outer layer having an inner surface and a barrier layer which is impermeable to said volatile molecules of the medium that is to be transported, characterized by the feature that said barrier layer is positioned between said inner layer outer surface (16) and said outer layer inner surface and comprises sub-elements that are arranged in a scale-like manner and overlap in both the transportation direction of the medium and coaxially relative to said longitudinal axis and further characterized by the feature that said barrier layer (26) is a metal or synthetic material affixed to said inner surface by vapor deposition.

4. A flexible cord-like hollow object according to claim 3 wherein the surface to which said barrier layer is adhered is treated physically and/or chemically in order to increase the strength of adhesion of the barrier layer.

5. A flexible cord-like hollow object according to claim 3 wherein the surface to which said barrier layer is adhered is roughened.

6. A flexible cord-like hollow object according to claim 3 wherein the surface to which said barrier layer is adhered is polarized.

7. A flexible cord-like hollow object according to claim 3 wherein at least one of said inner layer or outer layer is a polymeric material.

8. A flexible cord-like hollow object according to claim 3 wherein a bonding agent is arranged between said barrier layer and the surface to which said barrier layer is adhered.

9. A flexible cord-like hollow object comprising a casing (12) extending along an axis and encircling an inner zone for the transportation of a medium having volatile molecules, whereby a barrier layer (26), which is impermeable to said volatile molecules of the medium that is to be transported, is integrated into the casing (12), said casing comprising an inner layer (18) with an outer surface (16), a middle layer (20) and an outer layer (22), at least one of which is a polymeric material, characterized by the feature that the barrier layer (26) is arranged on the outer surface (16) of said inner layer (18) of the casing and comprises sub-elements (30) that are arranged in a scale-like manner to overlap in the transportation direction of the medium and to overlap coaxially relative to said axis, and characterized by the feature that said barrier layer (26) is affixed by vapor deposition to said inner layer outer surface.

* * * * *